United States Patent
Agarwal

(10) Patent No.: US 9,948,547 B2
(45) Date of Patent: *Apr. 17, 2018

(54) ROUTE TRACING IN SOFTWARE DEFINED NETWORKS

(71) Applicant: International Business Machines Corporation, Armonk, NY (US)

(72) Inventor: Kanak B. Agarwal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,366

(22) Filed: Apr. 28, 2017

(65) Prior Publication Data

US 2017/0237653 A1    Aug. 17, 2017

Related U.S. Application Data

(63) Continuation of application No. 14/196,005, filed on Mar. 4, 2014.

(51) Int. Cl.

| H04L 12/813 | (2013.01) |
|---|---|
| H04L 12/947 | (2013.01) |
| H04L 12/935 | (2013.01) |
| H04L 12/24 | (2006.01) |
| H04L 12/26 | (2006.01) |
| H04L 12/721 | (2013.01) |

(52) U.S. Cl.
CPC .............. *H04L 45/26* (2013.01); *H04L 41/12* (2013.01); *H04L 45/70* (2013.01); *H04L 47/20* (2013.01); *H04L 49/25* (2013.01); *H04L 49/30* (2013.01); *H04L 41/24* (2013.01); *H04L 43/10* (2013.01)

(58) Field of Classification Search
CPC ........................ H04L 12/2678–12/2684; H04L 41/085–41/0853; H04L 41/12; H04L 41/24; H04L 43/10–43/106; H04L 45/02; H04L 45/26; H04L 45/70

See application file for complete search history.

(56) References Cited

U.S. PATENT DOCUMENTS

| 7,454,439 B1 | 11/2008 | Gansner et al. |
|---|---|---|
| 2013/0265886 A1 | 10/2013 | Leong et al. |
| 2013/0283374 A1 | 10/2013 | Zisapel et al. |

(Continued)

OTHER PUBLICATIONS

U.S. Appl. No. 14/196,005, 2 pages.

(Continued)

*Primary Examiner* — Eric Myers
(74) *Attorney, Agent, or Firm* — Stephen T. Walder, Jr.; Mercedes L. Hobson

(57) ABSTRACT

Mechanisms are provided for tracing a route taken by a packet in a Software Defined Network (SDN). Each switch in the SDN is assigned a first color label, from a set of color labels, such that such that adjacent switches have different color labels. Rules are installed in each switch to forward a received data packet to the SDN controller in response to a second color label of the received data packet not matching the first color label assigned to the switch. A second color label, from the set of color labels, is assigned to a trace data packet. A route of the trace data packet is traced through the SDN based on the second color label and application of the one or more rules to the trace data packet at each of the switches in the SDN as the trace data packet is received by each of the switches in the SDN.

20 Claims, 13 Drawing Sheets

(56) References Cited

U.S. PATENT DOCUMENTS

| | | |
|---|---|---|
| 2013/0311675 A1 | 11/2013 | Kancherla |
| 2013/0315248 A1 | 11/2013 | Morimoto |
| 2013/0318243 A1 | 11/2013 | Chinthalapati et al. |
| 2015/0256397 A1 | 9/2015 | Agarwal |
| 2016/0056886 A1 | 2/2016 | Kitamura et al. |
| 2016/0149791 A1 | 5/2016 | Ganichev et al. |

OTHER PUBLICATIONS

"Traceroute", Wikipedia, http://en.wikipedia.org/wiki/Traceroute, accessed on Mar. 4, 2014, 4 pages.

Handigol, Nikhil et al., "Where is the Debugger for my Software-Defined Network?", Proceedings of the first workshop on Hot topics in software defined networks (HotSDN'12), Aug. 13, 2012, 6 pages.

Kanizo, Yossi et al., "Palette: Distributing Tables in Software-Defined Networks", IEEE Infocom Mini-conference, Technical Report TR12-05, COMNET, Technion, Israel, 2013, pp. 1-12.

Kazemian, Peyman et al., "Header Space Analysis: Static Checking for Networks", 9th USENIX Symposium on Networked Systems Design and Implementation (NSDI '12), Apr. 2012, pp. 1-14.

ROUTE TRACING IN SOFTWARE DEFINED NETWORKS

This application is a continuation of application Ser. No. 14/196,005, filed Mar. 4, 2014, status awaiting publication.

BACKGROUND

The present application relates generally to an improved data processing apparatus and method and more specifically to mechanisms for performing route tracing in software defined networks.

Software-defined networking (SDN) is an approach to computer networking which allows network administrators to manage network services through abstraction of lower level functionality. This is done by decoupling the system that makes decisions about where traffic is sent (the control plane) from the underlying systems that forwards traffic to the selected destination (the data plane). With SDN, network intelligence and state are logically centralized and the underlying network infrastructure is abstracted from the applications.

SDN requires some mechanism for the control plane to communicate with the data plane. One such mechanism, OpenFlow, is a standard interface designed specifically for SDN which structures communication between the control and data planes of supported network devices. OpenFlow allows direct access to, and manipulation of, the forwarding plane of network devices, such as switches and routers—both physical and virtual (hypervisor based). The OpenFlow protocol defines basic primitives that can be used by an external software application to program the forwarding plane of network devices, similar to the instruction set of a processor.

OpenFlow uses the concept of flows to identify network traffic based on pre-defined match rules that can be statically or dynamically programmed by the SDN control software. Since OpenFlow allows the network to be programmed on a very fine-grained match basis, an OpenFlow-based SDN architecture provides extreme granular control, enabling the network to respond to real-time changes at the application, user, and session levels.

SUMMARY

In one illustrative embodiment, a method, in a data processing system comprising a processor and a memory and implementing a software defined network (SDN) controller, for tracing a route taken by a packet in a SDN is provided. The method includes assigning, by the SDN controller, each switch in the SDN a first color label, from a set of color labels, such that adjacent switches are have different color labels. The method further includes installing, by the SDN controller, one or more rules in each switch to forward a received data packet to the SDN controller in response to a second color label of the received data packet not matching the first color label assigned to the switch. In addition, the method includes assigning, by the SDN controller, a second color label, from the set of color labels, to a trace data packet. Moreover, the method includes tracing, by the SDN controller, a route of the trace data packet through the SDN based on the second color label and application of the one or more rules to the trace data packet at each of the switches in the SDN as the trace data packet is received by each of the switches in the SDN.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
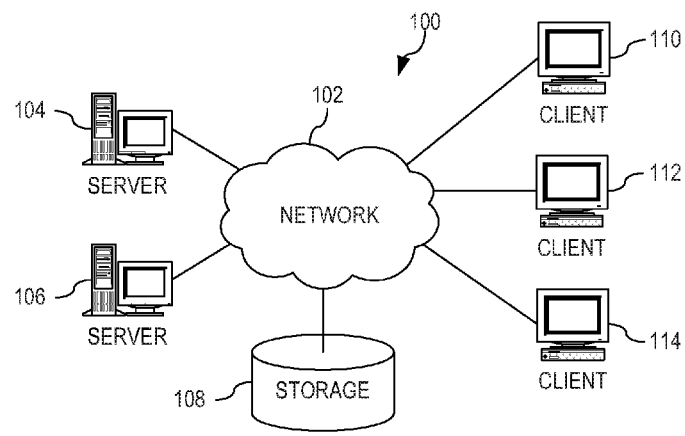
FIG. 1 is an example diagram of a distributed data processing system in which aspects of the illustrative embodiments may be implemented.

As discussed above, Software Defined Networks (SDN) allows the data plane state of switches of a network to be configured through software programs running on a logically centralized controller. Such configuration includes populating data packet forwarding rules in the switches to have matching rules to specify what direction to send an incoming packet, e.g., determining at each switch which port of the switch to transmit the packet through. The configuring of switches with data packet forwarding rules from a logically centralized controller allows software applications to directly control the network state by installing rules in the switch routing table data structures. Typically, multiple SDN applications, e.g., data packet forwarding applications, security applications, quality of service (QoS) applications, monitoring applications, and the like, must be composed together to provide a desired network behavior.

One type of logically centralized controller based SDN architecture utilizes the OpenFlow protocol. Under the OpenFlow protocol, the matching rules are based on 12-tuples (OpenFlow allows matching rules to be installed based on 12 header fields). The matching of fields in OpenFlow can either be an explicit match or a wildcard match. A wildcard match means the switch does not care what the value is in the specified field and thus, any value in that field matches the corresponding forwarding rule. An explicit match is a binary match, i.e. it matches or it does not. Even though OpenFlow protocol supports installing rules with very fine-grained matching of the packet header fields, the overall flexibility is limited by the available storage in switches, where the fine-grained forwarding state can be stored. The fine-grained forwarding rules are typically installed in the switch Ternary Content Addressable Memory (TCAM).

Because the centralized controller uses human developed software mechanisms and data structures, which may entail many applications or modules and corresponding data structures working together, to configure the switches of the network, it is possible that human error may result in an incorrectly configured network. Moreover, failures of switches or other conditions arising within the network may cause the routing of data packets through the software defined network to be less than optimal or not performed as desired.

Thus, it is important to be able to have a mechanism for performing route tracing through a software defined network (SDN) in order to observe the actual paths traversed through the SDN for debugging and troubleshooting operations. For example, areas where updates to forwarding rules may be necessary in order to obtain a desired configuration and operation of the SDN may be identified through the tracing of the routes taken by data packets through the SDN.

The illustrative embodiments address these issues by providing mechanisms for providing a trace route utility for tracking the actual route taken by a packet in a SDN. The trace route utility implements a specific coloring methodology for coloring the switches in the SDN that facilitates the forwarding of data packets to the logically centralized controller for tracing as the data packets are routed through the SDN. By the term "coloring" what is meant is that a specifically configured value or label, also referred to as a "color", is assigned to a switch in the SDN and the switch identifies itself as having that particular associated value, label, or "color". Thus, for example, the present description may refer to the color as "red" which may be implemented in a numerical notation as the value or label "001." Both "red" and "001" are the "color" or label of the switch. Any labeling scheme can be used to color the switches in accordance with the particular coloring methodology described herein (hereafter this will be referred to as "coloring" the switches with the label or value being referred to as the "color" of the switch). As discussed hereafter, labels are mapped onto packet header fields, such as IP-ToS bits and VLAN PCP bits, which are used as the container fields for carrying the "color" or the label information for the switches of the SDN in the packets.

The coloring methodology implemented by the trace route utility of the illustrative embodiments assigns a color to each switch of the SDN such that no two adjacent switches are assigned the same color, i.e. adjacent switches have different color labels. A plurality of colors are defined in a color set and these colors are correspondingly assigned to the switches in accordance with the coloring methodology. The particular number of colors included in the color set is implementation and topology dependent and any number of colors may be used without departing from the spirit and scope of the illustrative embodiments. For example, in many implementations color sets comprising 3 or 4 colors may be utilized, although more or less colors may also be used. In practice, the coloring methodology uses the minimum number of colors such that the graph topology of the switches may be colored with the constraint that any two switches directly connected through a link are assigned different colors.

Based on the assigned color of a switch, a corresponding label is assigned to the switch. A label represents a set of bits that correspond to a particular unused header field in the packets. For example, if the color is "red" and the 3-bit VLAN Priority Code Point (PCP) header field is used as the container field for the label, then a 3-bit label of "001" may be assigned to "red" colored switches. Other labels for designating other colors assigned to other switches may likewise be utilized.

An unused header field of data packets is utilized in data packets to represent a color of the switch forwarding the data packet or otherwise associated with the data packet. A similar field in matching rules may be utilized to identify the color with which the matching rule matches when a data packet is received by the switch implementing the matching rule. Thus, for example, the unused header field VLAN PCP (3-bits) or IP ToS (6 bits), or the like, in a data packet and/or matching rule, may be utilized for purposes of storing the associated color and identifying the matching color for a matching rule deployed into a switch. This unused field will be referred to herein as the "color field" for the data packet and matching rule. Here the term "unused" refers to the fact that this particular field in not used by any of the other SDN applications to configure the forwarding rules in the SDN switches based on a match in this field.

In accordance with the route tracing utility mechanisms of the illustrative embodiments, the switches of the SDN are configured with forwarding rules, specified as data structures, that match based on the color field of the data packets. In particular, one or more matching rules for route tracing are deployed in each of the switches of the SDN that matches if the color label in the color field of a received data packet indicates a color different from the color assigned to the switch itself. Thus, for example, if the color of the switch is "red" and the color label in the received data packet corresponds to a color of "blue," then the matching rule for route tracing will be matched and a corresponding action specified in the route tracing rule is triggered. In accordance with the illustrative embodiments, this action causes a forwarding of the received data packet to the logically centralized controller for purposes of recording route tracing information in a route tracing data structure.

The logically centralized controller records the route tracing information for the data packet forwarded by the switch and then modifies the color label of the data packet to be the color of the switch that forwarded the packet. The data packet is then sent back to the switch that forwarded the packet which then uses its matching rules of its routing table to route the data packet to an output port of the switch to forward the packet along the next path of the SDN to a next switch of the SDN or to the destination node. This process is then repeated at the next switch such that at each switch of the SDN, the route taken by the data packet may be traced and recorded by the logically centralized controller. As a result a complete trace of the data packet through the SDN network is facilitated.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
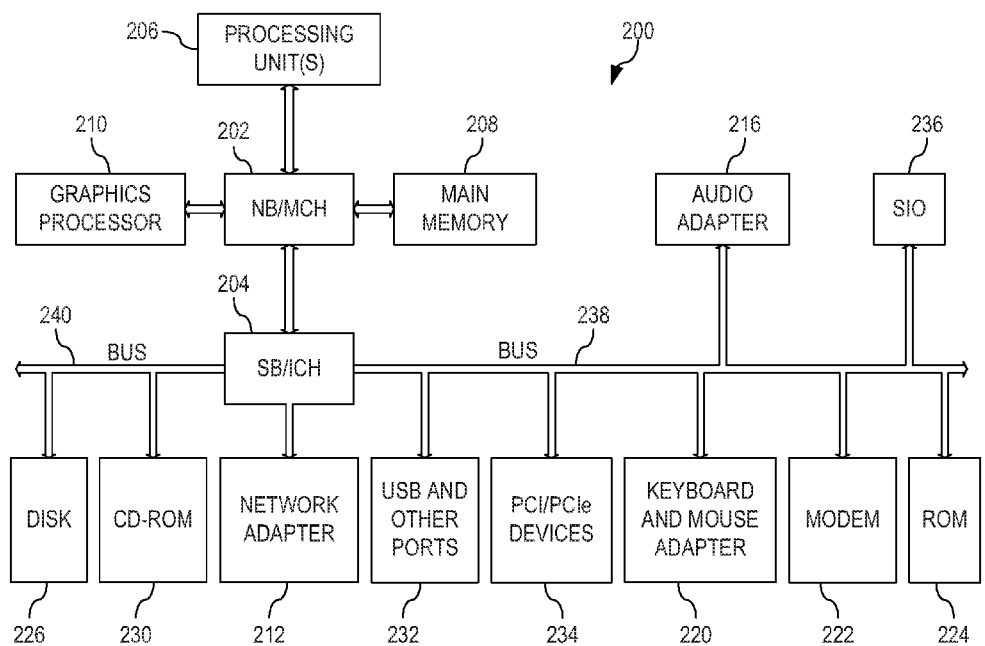
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7°. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, the network 102 is comprised of a plurality of network routing and forwarding devices, e.g., switches, routers, and the like. One or more of the computing devices coupled to the network 102, e.g., server 104 or 106, may implement a network controller, such as a Software Defined Network (SDN) controller that, in accordance with the illustrative embodiments, provides mechanisms for coloring the forwarding devices (hereafter assumed to be switches for purposes of description) of the network 102, configuring the forwarding devices with such colors, deploying matching rules for route tracing, and implementing route tracing operations based on the coloring of the forwarding devices. The controller maintains information regarding host system connectivity to the network 102 as wells as the coloring of the switches of the network 102. Moreover, the controller maintains a route tracing data structure having entries for data packet routes traced through the network 102.

The controller comprises coloring logic for coloring switches of the network 102 in accordance with a coloring methodology, in which no adjacent switches of the network topology have a same color. The controller further includes route tracing rule deployment logic for deploying route tracing rules to switches of the network 102 for forwarding data packets received by switches to the controller for purposes of route tracing by the controller. The controller also includes logic for recording route trace records for received data packets and modifying traced data packets for purposes of continuing the route tracing through the network. Each of these functionalities will be described in greater detail with regard to the following figures.

Figure 3A:
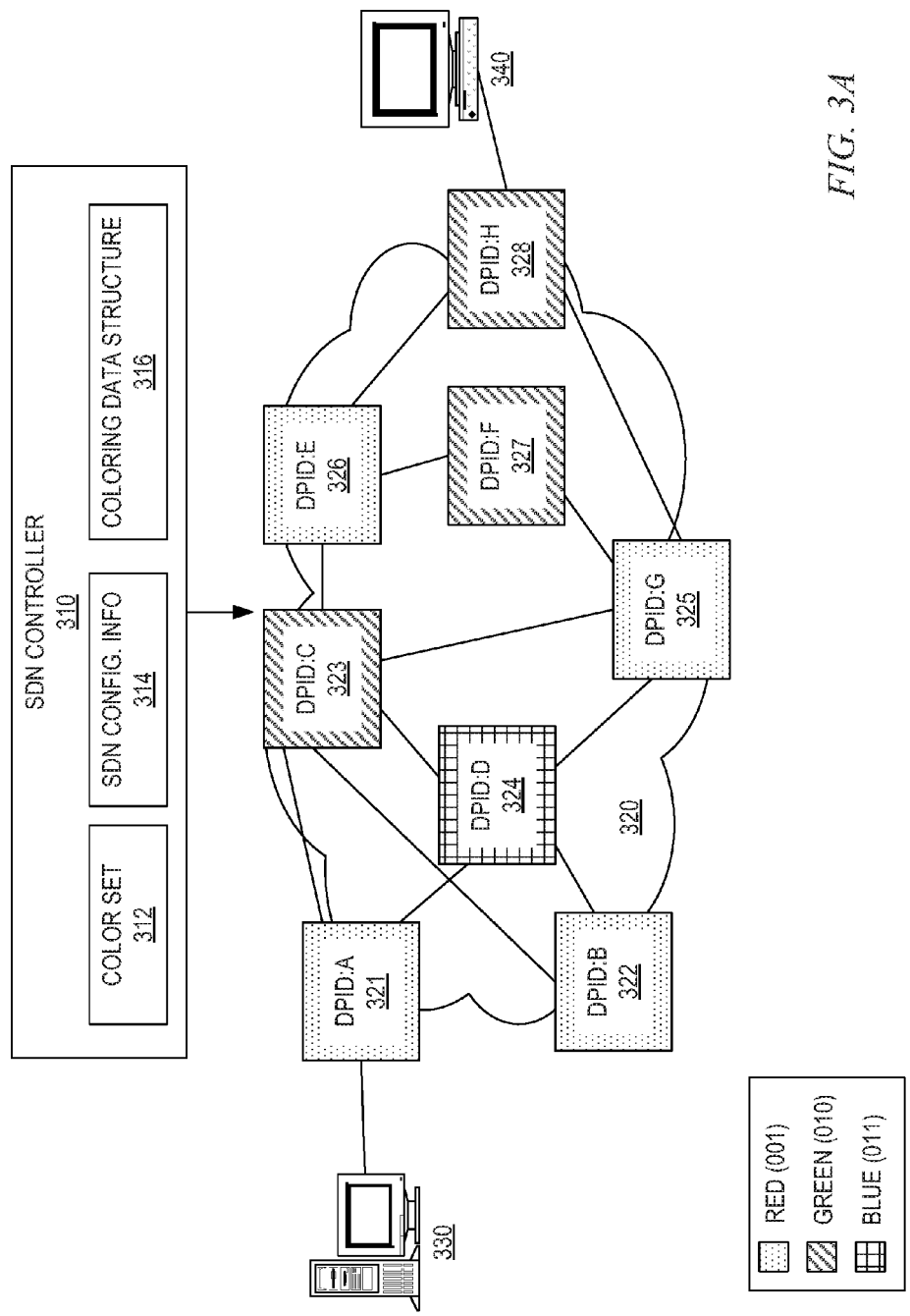
FIG. 3A illustrates the assignment of colors to switches in a software defined network (SDN) in accordance with one illustrative embodiment.
Figure 3B:
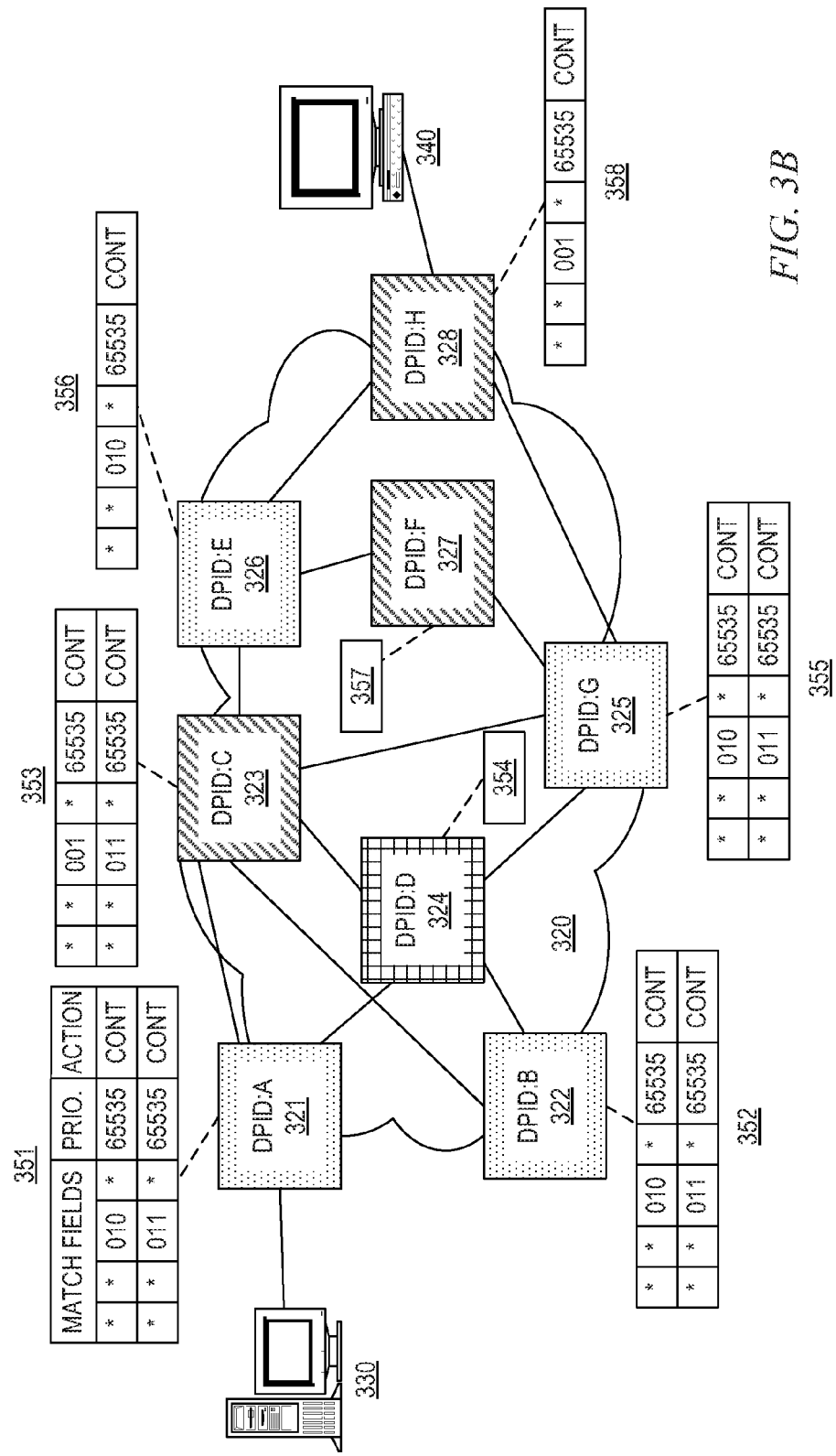
FIG. 3B illustrates the distribution of route tracing matching rules to the switches of a SDN in accordance with one illustrative embodiment.

In order to provide a better understanding of the operation of the route tracing, FIGS. 3A-B are provided to illustrate the configuration of switches of a network in accordance with the illustrative embodiments while FIGS. 4A-4F are provided to illustrate the manner by which data packet routes are traced through the network using the configuration of switches set forth in FIGS. 3A-3B.

FIG. 3A illustrates the assignment of colors to switches in a software defined network (SDN) in accordance with one illustrative embodiment. As shown in FIG. 3A, a SDN controller 310 is configured with a color set 312 specifying a set of colors and/or labels that may be used for allocation to the switches 321-328 (having Datapath Identifiers (DPIDs) A-H) of the SDN 320. In addition, the SDN controller 310 further stores host device configuration information 314 comprising host system 330, 340 connectivity information for host systems coupled to the network 320 including, for example, attachment ports of an edge switch 321 or 328 with which the host system 330, 340 is connected, and the like. This SDN configuration information may further comprise information regarding the various switches, or data packet forwarding devices, in the SDN 320 and their connectivity as well such that a complete topology of the SDN 320 is made possible with the SDN configuration information 314.

The SDN controller 310 implements a coloring methodology in which the colors of the color set 312 are utilized to assign colors to the switches 321-328 of the SDN 320 such that no two adjacent switches 321-328 have the same assigned color. The term "adjacent" refers to switches that are directly connected to one another via a communication link. Thus, a first switch is adjacent to a second switch if there is a communication connection that directly links the first switch to the second switch and is not adjacent if the first switch is indirectly connected, or not connected at all, to the second switch, where an "indirect" connection refers to the connection being performed through one or more other switches of the network. For example, in the depicted example switch 321 is adjacent to switches 323 and 324 but is not adjacent to switch 322.

In the depicted example, the color set 312 includes 3 colors red, green, and blue with associated labels 001, 010, and 011. Through coloring assignment logic of the SDN controller 310, colors are assigned to the switches in accordance with the coloring methodology such that switch 321, for example, has the color "red", switch 322 is assigned the color "red" (since it is not adjacent to switch 321, such coloring does not violate the coloring methodology), switch 323 is assigned the color "green", switch 324 is assigned the color "blue", switch 325 is assigned the color "red", switch 326 is assigned the color "green", switch 327 is assigned the color "red", switch 328 is assigned the color "green", and so on. Corresponding labels for the assigned colors may be associated with these switches 321-328 as well. The SDN controller 320 may maintain a coloring data structure 316 that associates the assigned colors and labels with the particular switches of the SDN 320. This coloring methodology facilitates the forwarding of data packets to the SDN controller 310 for route tracing as described hereafter.

FIG. 3B illustrates the distribution of route tracing matching rules to the switches of a SDN in accordance with one illustrative embodiment. Elements of the example shown in FIG. 3B that correspond to similar elements in FIG. 3A are given the same reference numbers as shown in FIG. 3A for consistency. The distribution of route tracing matching rules as show in FIG. 3B is based on the coloring of switches performed, such as shown in FIG. 3A, for example. The route tracing matching rules are distributed to the switches 321-328 of the SDN 320 by route tracing matching rule installation logic of the SDN controller 310. The distribution of these route tracing matching rules may be performed, for example, using commands transmitted by the SDN controller 310 to the switches 321-328 to update their local matching rule data structures, also referred to as routing data structure, to include these route tracing matching rules. These matching rules, and route tracing matching rule, are stored, for example, in a table data structure storage device 351-358 of the corresponding switch 321-328.

As shown in FIG. 3B, matching rules in the table data structure storage device structures 351-358, e.g., TCAM or the like, of the switches 321-328 have a format comprising match fields, priority value, and an action identifier. The match fields may comprise one or more fields of a data packet against which the matching rule is evaluated to determine whether the action corresponding to the matching rule should be triggered. That is, if the header fields of a received data packet matches each of the corresponding match fields of the matching rule, then a match is identified and the action of the matching rule that is matched is triggered. Examples of header fields and match fields may include source address, destination address, source port, destination port, and the like.

With particular importance to the present invention, an unused header field, and corresponding match field, is selected for storing a color value, referred to herein as the color field. That is, one of the match fields and one of the header fields of a data packet, stores a color label associated with the data packet or matching rule. This color field may store the color of the switch that forwarded the data packet, for example, and may be updated dynamically as the data packet is routed through the SDN 320. In some illustrative embodiments, the color field is only used for data packets that are being used to perform route tracing while other data packets that correspond to communications between host systems 330 and 340 that are not directed to route tracing may not utilize these color fields. In such a case, dynamic updating of the color field may not be utilized in the embodiment and separate mechanisms in the SDN controller 310 may be provided for updating the color field as described hereafter.

As noted above, values in match fields may be given a wildcard or "don't care" value that indicates that any value in a corresponding header field of a received data packet will match that match field in the matching rule. In the depicted example, for purposes of this description, all matching fields in the match fields of the route tracing matching rules are wildcards with the exception of the color field. Similarly, for matching rules used to forward data packets to ports of the switch, the color field of the matching rules and/or the data packets may be set to wildcard or "don't care" values.

The priority field of the matching rules specifies a relative priority of the matching rule with regard to other matching rules maintained in the table data structure storage devices 351-358 of the switches 321-328. Matching rules may be evaluated in accordance with the priority values stored in these priority fields such that higher priority matching rules are evaluated prior to lower priority matching rules. Moreover, conflicts between matching rules may be rectified in accordance with these priorities. In accordance with the illustrative embodiments, route tracing matching rules are given a highest possible priority value in their priority field such that these route tracing matching rules are evaluated prior to any of the matching rules used by other SDN applications for forwarding data packets through the SDN 320. In this way, tracing operations can be performed prior to forwarding the route tracing data packet along links to other switches in the SDN 320.

In accordance with the illustrative embodiments, it should be appreciated that one route tracing matching rule is generated for each color in the color set 312 maintained by the SDN controller 310. These route tracing rules essentially state that if a color value or label in the color field of a received data packet matches the color value or label stored in the color field of the route tracing matching rule, then the data packet is forwarded to the SDN controller 310. Using the format shown in FIG. 3B, and taking table data structure storage device 351 of switch 321 as an example, this functionality is specified by using the VLAN PCP matching field to specify a color value or label, e.g., "010" or "011", the priority field to specify a highest priority value, e.g., "65535", and an action field specifying an action to forward to the SDN controller 310, e.g., "CONT".

A switch is deployed with the route tracing matching rules corresponding to the colors of the color set 312 that are not the color assigned to the switch. In other words, the route tracing matching rules only match data packets whose color field color value does not match the color value assigned to that particular switch. Thus, for example, switch 321 is assigned the color value for the color "red" and thus, route tracing matching rules corresponding to color values for the colors "blue" and "green" are deployed into the switch 321. This deployment of route tracing matching rules may be performed by the SDN controller 310 by determining the color assigned to a switch using the color assignment and deploying the route tracing matching rules for the colors that do not match the color assignment of the switch.

With the assignment of colors to the switches 321-328 of the SDN 320 in accordance with the coloring methodology of the illustrative embodiments, and the deployment of route tracing matching rules the various switches 321-328 in accordance with the color assignments of the switches 321-328, the switches 321-328 apply the matching rules in their respective table data structure storage devices 351-358 when performing routing operations on the data packets received by these switches 321-328. The application of the matching rules includes application of the high priority route tracing matching rules to data packets that are received. However, in accordance with one illustrative embodiment of the present invention, the color values are set in the color fields of only the data packets that are specifically utilized for route tracing such that not all data packets have color fields with valid color values set. The data packets that are not used for route tracing will have wildcard or "don't care" values, or even invalid color values, set in the color field such that they will not match the route tracing matching rules deployed in the switches 321-328.

FIGS. 4A-4F are example diagrams illustrating a route tracing operation using the coloring mechanism and deployed route tracing matching rules in the switches of the SDN in accordance with one illustrative embodiment. Again, elements corresponding to similar elements in the example of FIGS. 3A-3B are shown with similar reference numbers for consistency.

When a route is to be traced through the SDN 320 for purposes of collecting routing data for debugging, troubleshooting, or performing other management operations associated with the SDN 320, the SDN controller 310 creates a data packet with the same header fields as the fields of the data packet it wants to trace. That is, rather than an actual data packet that is sent from the host system 330 to the host system 340, or vice versa, the SDN controller 310 generates a copy of that data packet for purposes of tracing. This copy of the data packet will hereafter be referred to as the trace data packet 380.

The source host and ingress switch/port information for the data packet are identified by the SDN controller 310, such as via the packet_in message operation where a packet from a host device is forwarded by the switch to the SDN controller 310 as a packet_in message and the SDN controller 310 uses the information in the packet_in to learn about the device and its attachment point (switch/port) where the host device is attached. The source host information and host connectivity information including the ingress switch/port information may be obtained from the host information 314. This information may be used to configure the trace data packet 380. In addition, the color value or label associated with the color assigned to the ingress switch is identified from the coloring data structure 316 and used to populate the color field in the header of the trace data packet 380.

Figure 4A:
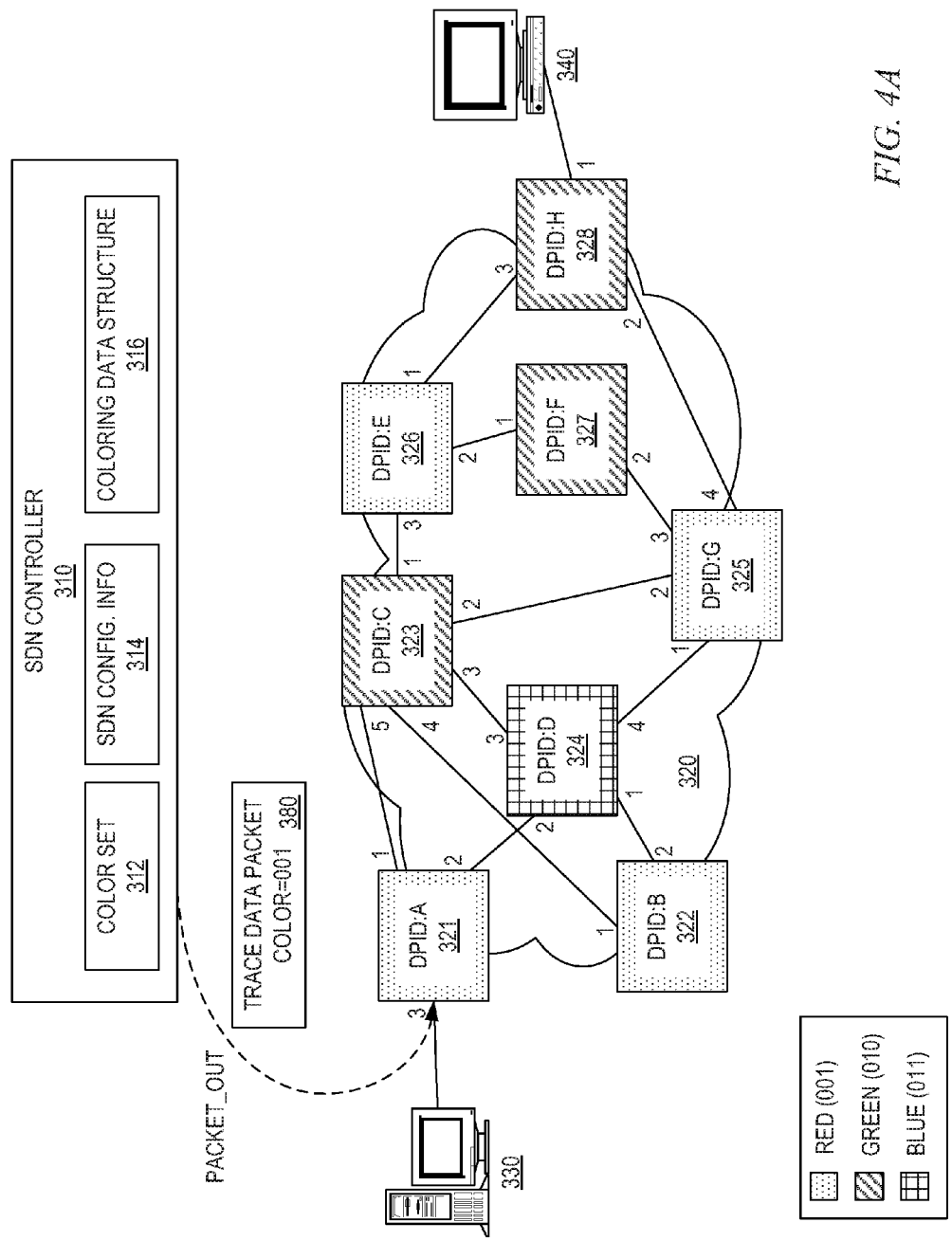
FIGS. 4A-4F are example diagrams illustrating a route tracing operation using the coloring mechanism and deployed route tracing matching rules in the switches of the SDN in accordance with one illustrative embodiment.

The trace data packet 380 is then transmitted by the SDN controller 310 to the ingress switch of the source host system 330, e.g., switch 321. The input port specified in the information sent with the trace data packet 380 is set to the port where the source host system 330 is connected (e.g., port 3) and the action field for the trace data packet 380 is set to perform actions in the routing table data structure of the table data structure storage device 351 of the ingress switch 321, (e.g., action=TABLE for OpenFlow protocol). For example, the SDN controller 310 utilizing OpenFlow protocol may send a packet_out message to the ingress switch 321 of the type packet_out: {src:A, dest:B, . . . input port: 3, VLAN PCP: 001, action:TABLE} as shown in FIG. 4A. As a result, the ingress switch 321 receives the packet_out message from the SDN controller 310 which is tagged with the ingress switch's own color, e.g., VLAN PCP: 001, where VLAN PCP is just one example of an unused header field that may be used to store color values or labels and thus, is the color field in this example.

Figure 4B:
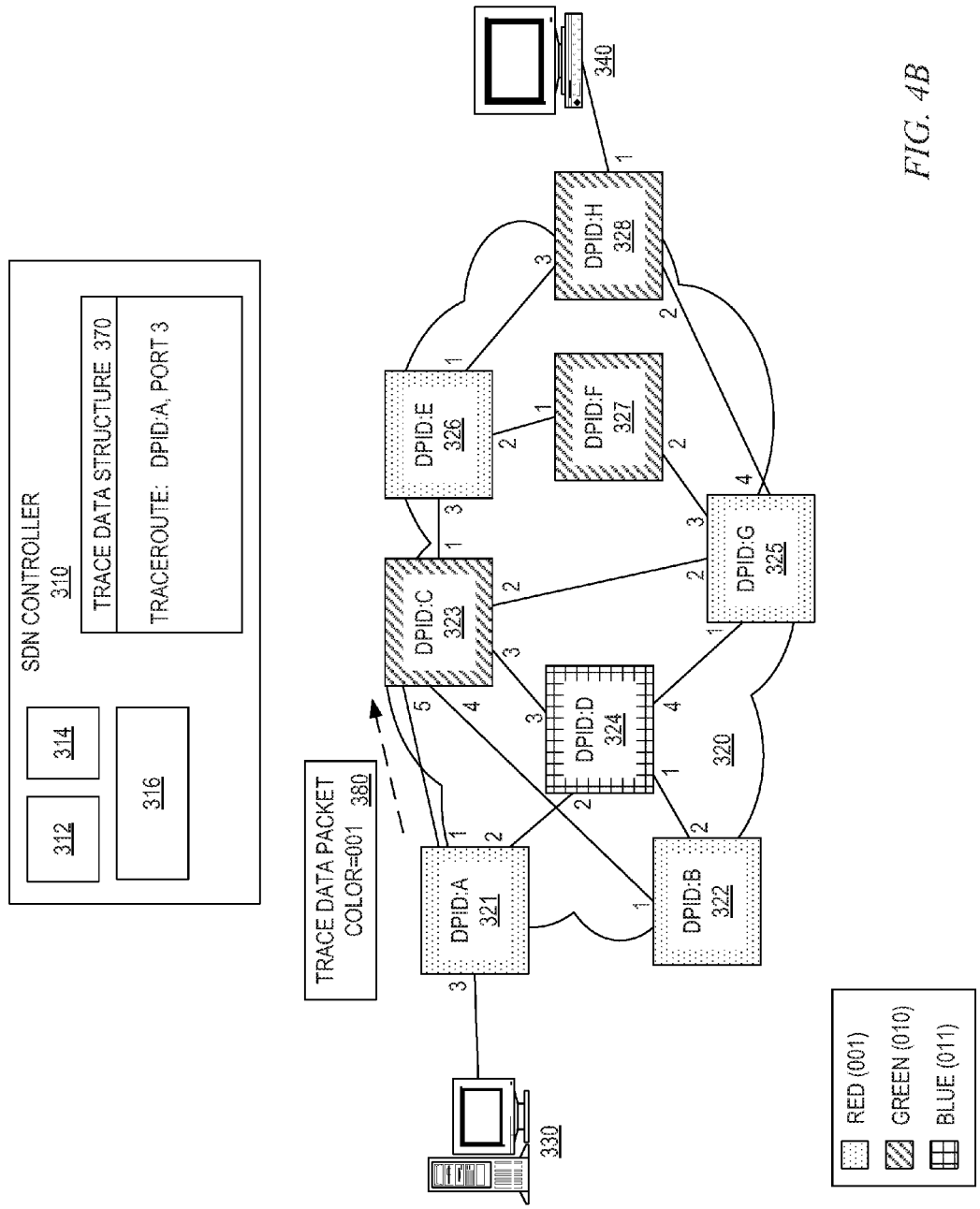

As shown in FIG. 4B, since the color of the trace data packet 380 is the same as the color assigned to the ingress switch 321, when applying the matching rules of the table data structure storage device 351, including the route tracing matching rule for performing route traces, the route tracing matching rules are not matched because they are tied to color values that are not the color value of the color of the ingress switch 321 (see FIG. 3B). As a result, the trace data packet 380 is routed through the SDN 320 to the next switch along a path to the destination host system 340 in accordance with the standard routing rules (or data plane rules configured by the other SDN applications) in the table data structure storage device 351 that identifies which port to send the data packet out on, e.g., port 1 in this case. Thus, the trace data packet 380 is transmitted to the switch 323 with the color value in the color field set to the color of the ingress switch, e.g., "red" or "001" in this example. In addition, an initial entry in the trace data structure 370 may be recorded indicating a trace route comprising a device ID corresponding to ingress switch 321, e.g., a Datapath Identifier (DPID) of "A", and a port through which the trace data packet was received by the ingress switch 321, i.e. port 3 in this example.

Figure 4C:
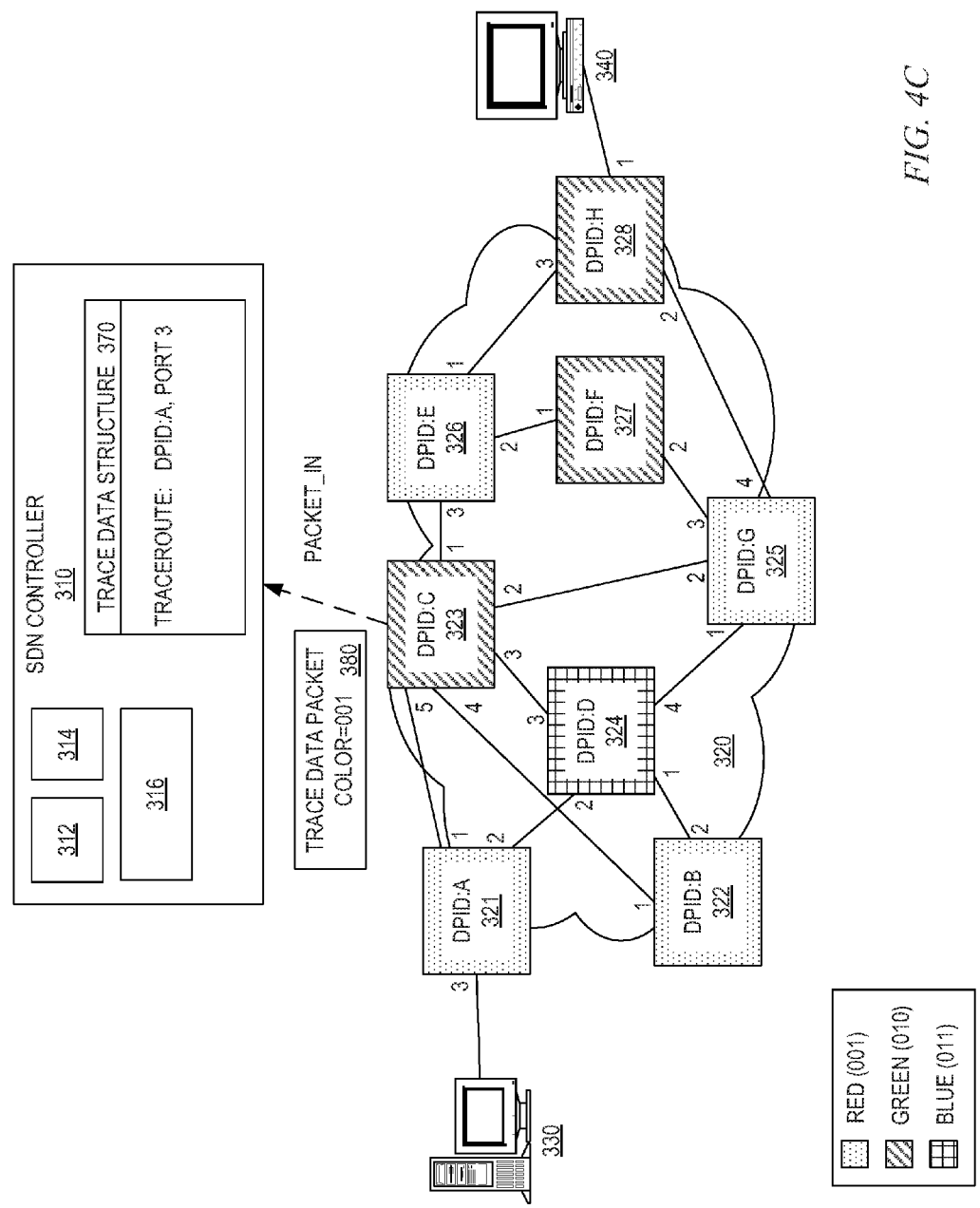

As shown in FIG. 4C, the switch 323 receives the trace data packet 380 through port 5 and applies its own set of matching rules in its table data structure storage device 353 to the headers of the trace data packet 380. In this case, the color field of the header of the trace data packet 380 has a color value corresponding to the color "red", e.g., color value 001, which matches a route tracing matching rule in the table data structure storage device 353, e.g., the first rule in the table data structure storage device 353 shown in FIG. 3B, since the route tracing matching rules deployed to switch 323 match on color values that are not the color value of the switch 323 and the coloring methodology requires that the other adjacent switches have different colors from that of the color assigned to switch 323. As a result, the route tracing matching rule that is matched has a corresponding action indicating that the trace data packet 380 is to be forwarded to the SDN controller 310. Thus, the trace data packet 380 is forwarded to the SDN controller 310 indicating that it is a packet_in on input port 5 at the switch 323 having a DPID:C in this example.

Figure 4D:
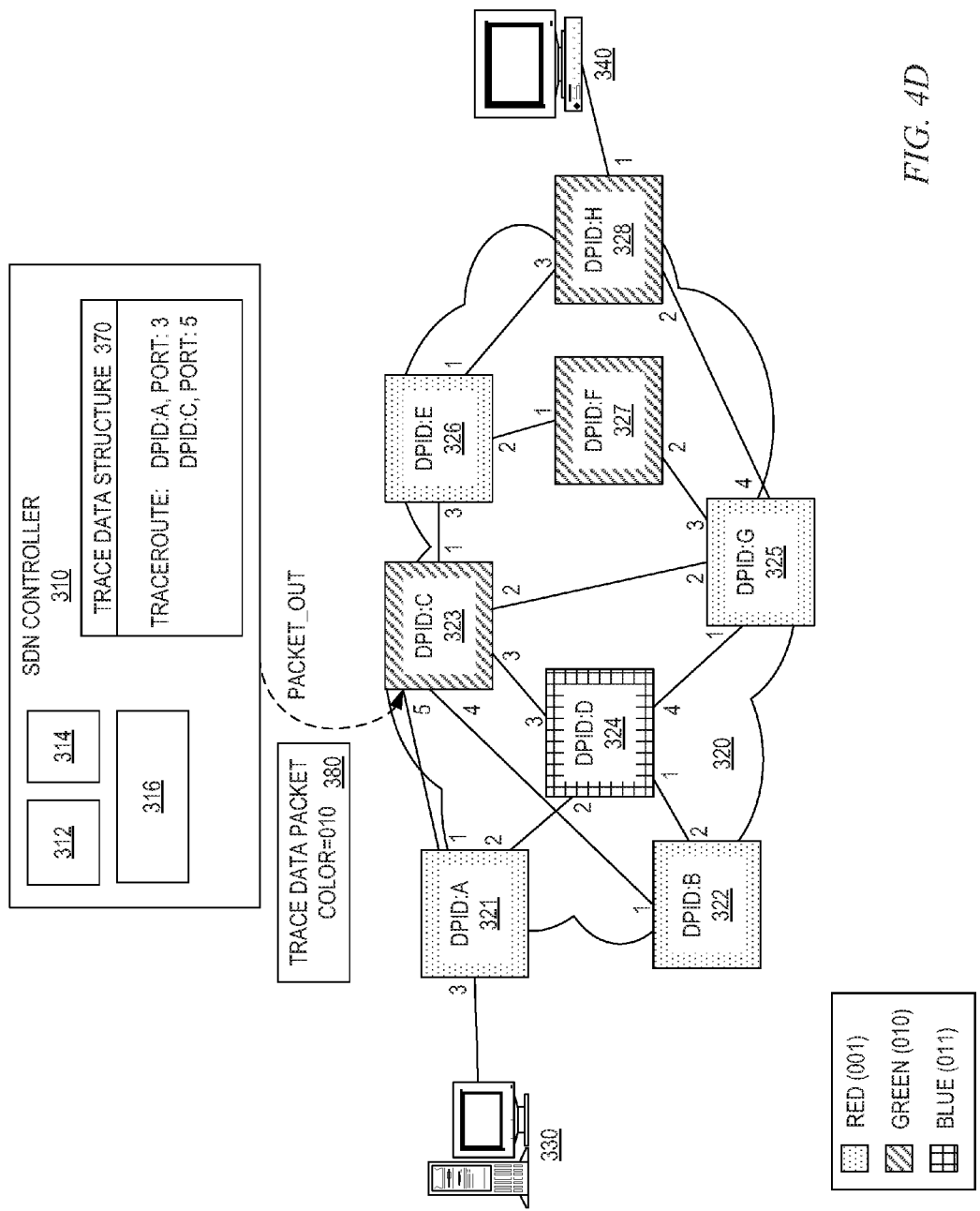

As shown in FIG. 4D, the SDN controller 310 receives the forwarded trace data packet 380 from the switch 323 and updates the trace route record in the trace data structure 370 to include an entry for the current "hop" of the trace data packet 380 to switch 323. In this example, the trace route record is updated to indicate that following the trace data packet 380 arriving at the switch 321 on port 3, the trace data packet 380 was received at switch 323 with DPID:C via port 5. In addition, the SDN controller 310 updates the color field in the header of the trace data packet 380 to store the color value for the switch 323 that forwarded the trace data packet 380 to the SDN controller 310, e.g., color value "green" or "010" in this example, and transmits the trace data packet 380 back to the switch 323 that forwarded the trace data packet 380 to the SDN controller 310. For example, this may be accomplished by sending a packet_out message to the switch 323 of the type packet_out: {input port: 5, . . . , VLAN PCP: 010, action:TABLE}.

Figure 4E:
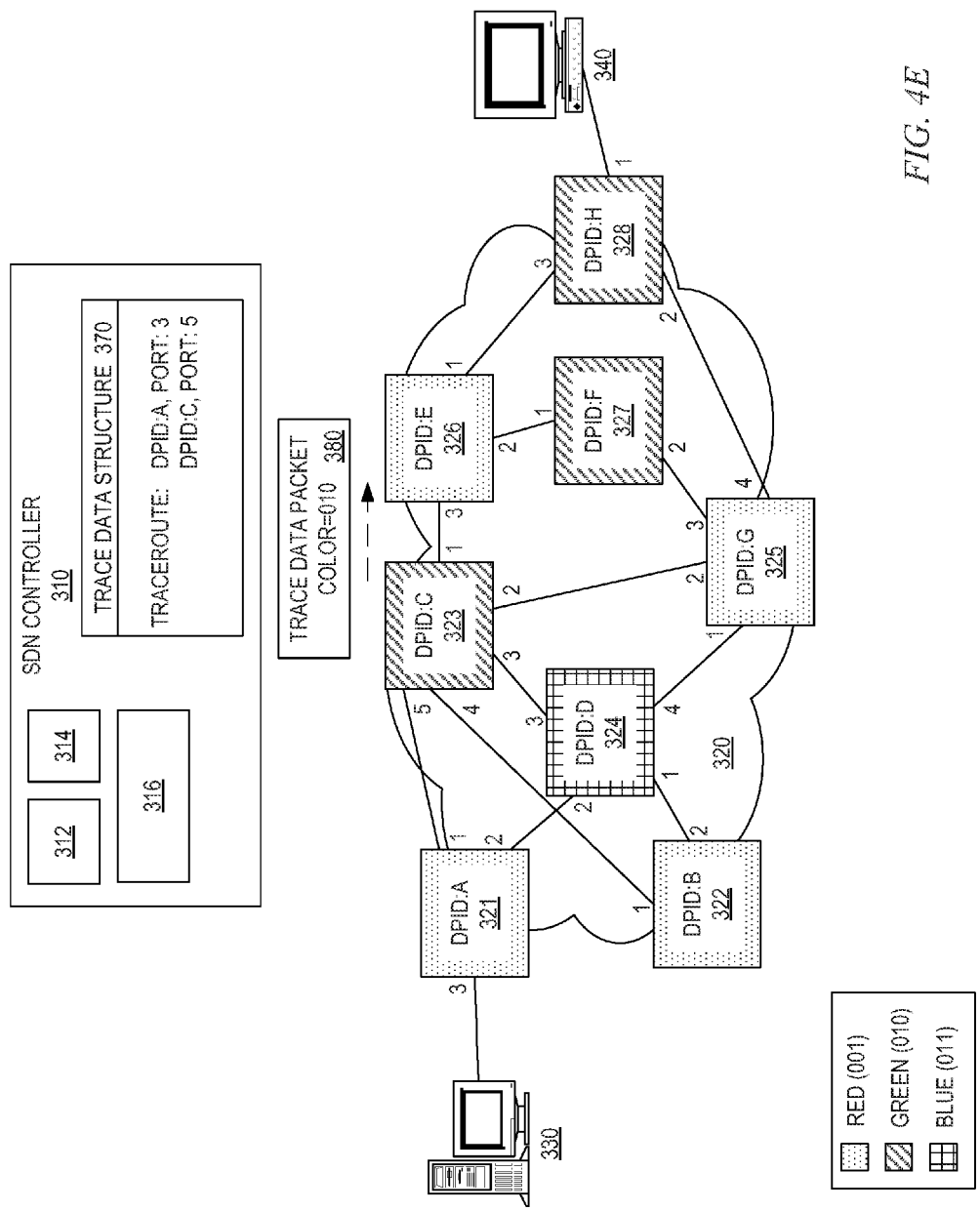

As shown in FIG. 4E, the switch 323 receives the updated trace data packet 380 from the SDN controller 310 with the color field value being set to the color value of the switch 323, e.g., color value/label is 010. As a result, when the switch 323 again applies its matching rules in the table data structure storage device 353, the route tracing matching rules are not matched since they are keyed to the color values other than the color value of the switch 323 and the updated trace data packet 380 has the color value corresponding to the switch 323. Thus, again, the switch 323 uses its standard matching rules for forwarding data packets, i.e. data plane rules, to forward the trace data packet 380 along the next hop to the next switch 326 along the route to the destination host system 340. Thus, a "green" colored trace data packet 380 is output to the switch 326.

Figure 4F:
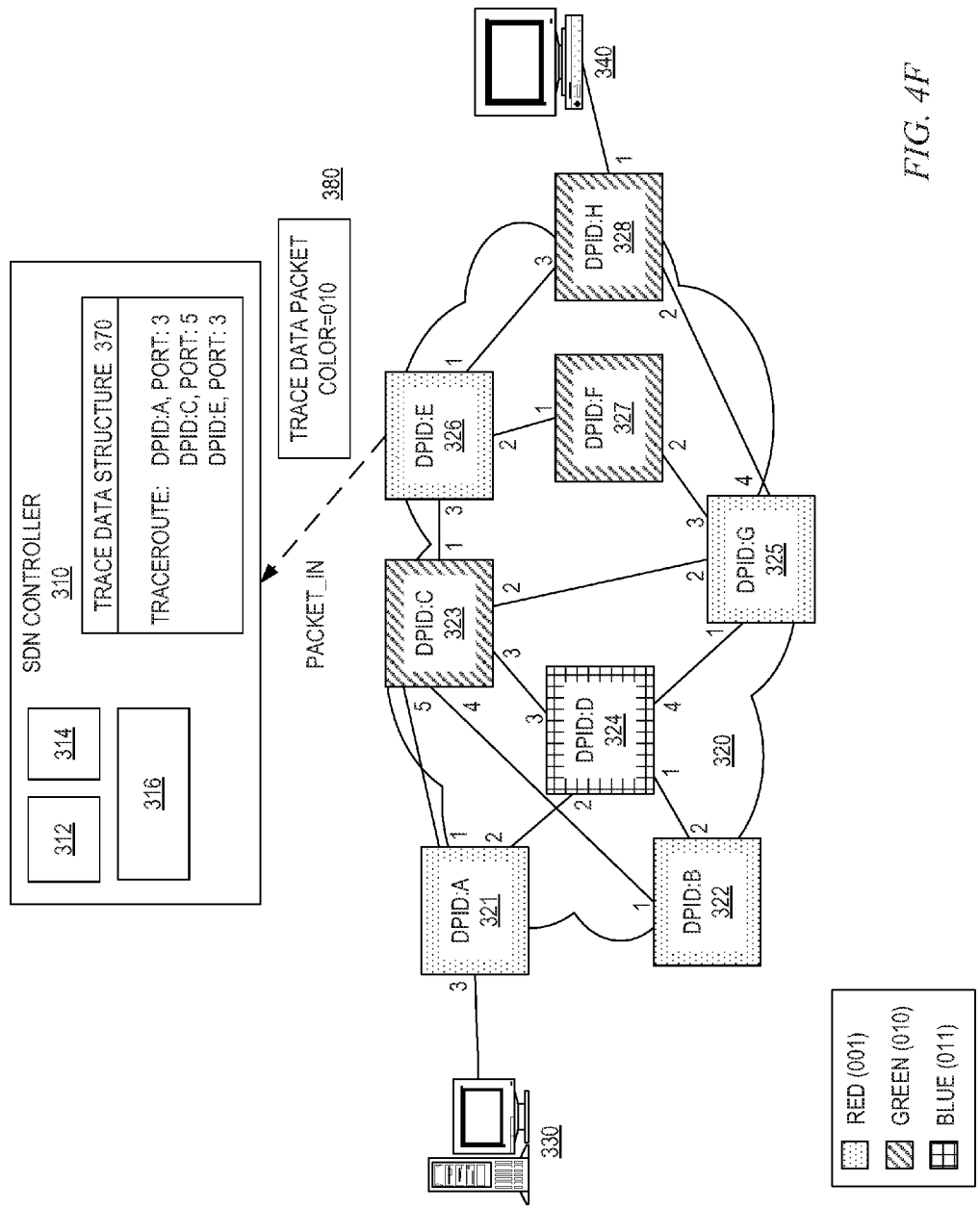

With reference now to FIG. 4F, a similar process as described above with regard to FIG. 4D is followed at switch 326. The switch 326 applies its matching rules of its table data structure storage device 356 to the received trace data packet 380 which results in the route tracing matching rule keyed to the "green" color, e.g., color value "010", being matched and its corresponding action being triggered, i.e. forwarding the data packet to the SDN controller 310. The SDN controller 310 again updates its trace route record in the trace data structure 370 to reflect that the trace data packet 380 was received in the switch 326, e.g., DPID:E on port:3. The trace data packet 380 is then updated such that the color value in the color field of the trace data packet header stores the color value corresponding to the color of the switch 326. The updated trace data packet 380 is then transmitted back to the switch 326 that forwarded the trace data packet 380 which then forwards the trace data packet 380 along the route to the destination 340 using its matching rules of its table data structure storage device 356 in a similar manner as previously described. This process continues until the trace data packet 380 is either received at the destination host system 340 or a time out occurs where no activity is detected by the SDN controller 310.

It should be appreciated that the SDN controller 310 may, when updating the color value of the trace data packet 380, determine the color of the particular switch from which the trace data packet 380 was forwarded by performing a lookup operation of the switch identifier in the coloring data structure 316 maintained by the SDN controller 310. Thus, for example, the coloring data structure 316 may store an association of switch identifier, e.g., DPID, with the assigned color value or label for that switch 321-328. As a result, the lookup of the DPID in the coloring data structure 314 results in the identification of a color value or label for the switch 321-328 which may then be used to update the color value in the trace data packet 380.

Thus, by utilizing the coloring methodology of the illustrative embodiments along with the route tracing matching rules deployed to the switches of the network that are keyed to color values, a complete trace of the path following by a trace data packet may be recorded by the SDN controller. This information may be used to identify errors in the deployment of matching rules or other configuration of the SDN 320. Such information facilitates debugging and troubleshooting as well as other management operations for managing the operation of the SDN 320. For example, loops in data packet forwarding caused by incorrect configuration of current forwarding rules may be detected and corrective actions may be performed by installing new forwarding rules to avoid such loops.

Figure 5:
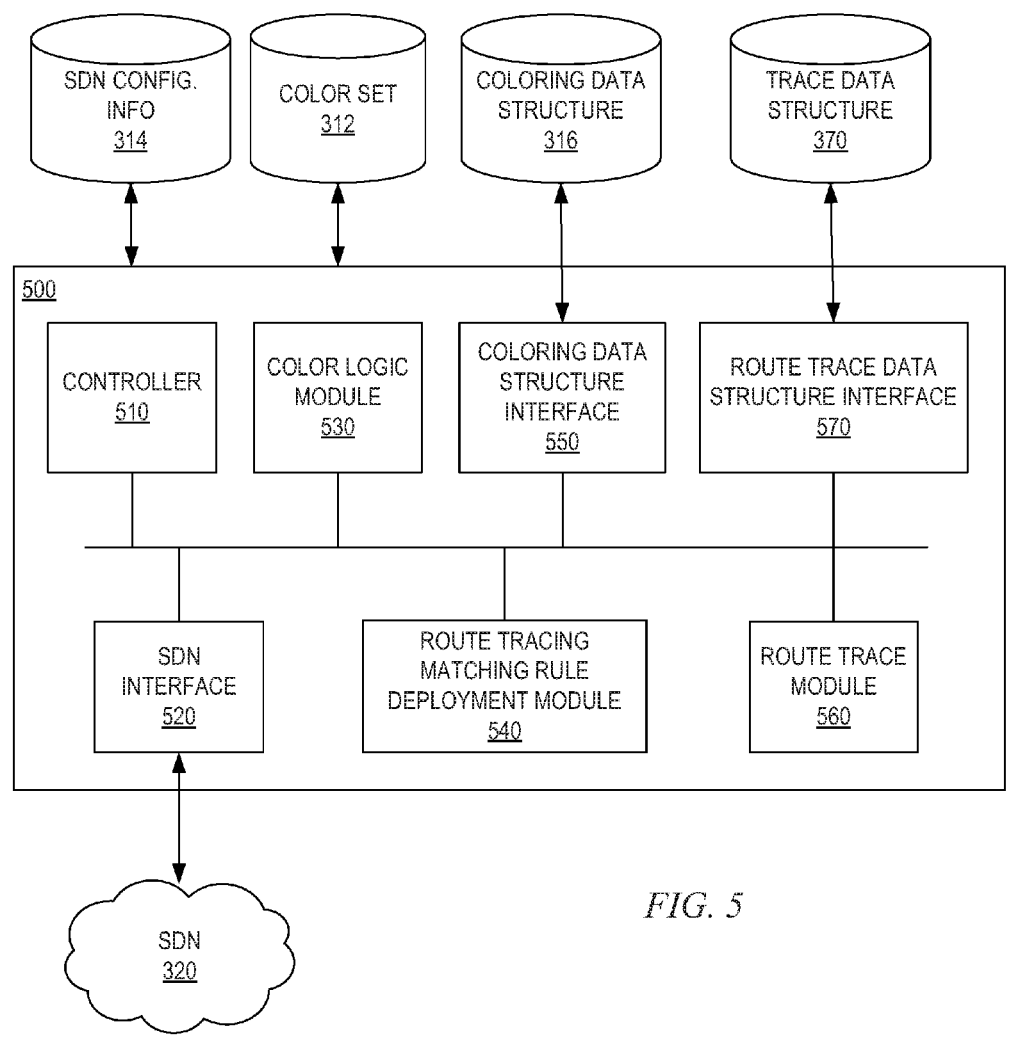
FIG. 5 is an example block diagram of a SDN controller in accordance with one illustrative embodiment.

As discussed above, the SDN controller 310 includes a number of different types of logic that are used to implement the various functions for facilitating the coloring and configuring of the switches in the SDN 320 for route tracing purposes as well as recording and updating trace data packets that are forwarded to the SDN controller 310. FIG. 5 is an example block diagram of a SDN controller, such as SDN controller 310, in accordance with one illustrative embodiment. It should be appreciated that the elements shown in FIG. 5 may be implemented as software executed on general purpose hardware, e.g., processors and memories, hardware specifically configured to implement the functionality and logic of the particular element, or any combination of software and hardware logic. In one illustrative embodiment, the elements of FIG. 5 are implemented as software instructions loaded into one or more memories of a data processing system and executed by one or more processors of the data processing system. In one illustrative embodiment, the logic of the elements in FIG. 5 is configured to implement the coloring and route tracing operations previously described above with regard to FIGS. 3A-4F.

As shown in FIG. 5, the SDN controller 500 includes a control module 510, a SDN interface 520, a coloring logic module 530, a route tracing matching rule deployment module 540, a coloring data structure interface 550, a route trace module 560, and a route trace data structure interface 570. The control module 510 includes logic for controlling the overall operation of the SDN controller 500 and orchestrating the operation of the other elements 520-570. Any functionality not specifically attributed to another module may be implemented by the control module 510.

The SDN interface 520 provides a data communication pathway between the SDN controller 500 and devices of a SDN. For example, the SDN interface 520 may provide a communication pathway through which messages may be transmitted to switches of the SDN so as to configure the matching rules of the switches, deploy route tracing matching rules, receive forwarded trace data packets from the switches, and transmit updated trace data packets back to the switches of the SDN.

The coloring logic module 530 utilizes a color set (not shown) with which it is configured to performing coloring of the switches or other devices of the SDN through which a route taken by data packets may be traced. The coloring logic module 530 may make use of SDN network topology information identifying the switches present in the SDN and their connections with one another to determine what colors to allocate to the switches in accordance with a coloring methodology and the color set. The coloring logic module 530 generates a coloring data structure that maps the identifiers of the devices of the SDN with color values or labels in accordance with the coloring methodology. As noted above, in some illustrative embodiments of the present invention, the coloring methodology requires that no two adjacent devices in the SDN have a same allocated color value or label. This is to facilitate the forwarding of trace data packets to the SDN controller for tracing the route taken by the trace data packets.

The resulting assignment of color values or labels to the devices of the SDN are recorded into a coloring data structure accessible via that coloring data structure interface 550. The assignment of color values or labels is further utilized to determine which route tracing matching rules are deployed to each of the devices of the SDN. That is, based on the color values or labels allocated to a switch of the SDN, the route tracing matching rules corresponding to the other color values or labels in the color set are deployed to the switch. The route tracing matching rule deployment module 540 determines which of these route tracing matching rules are to be deployed to each of the devices in the SDN and then generates and transmits install rule messages via the interface 520 to the devices to thereby deploy the route tracing matching rules to the devices which are then configured to implement these route tracing matching rules in their local set of matching rules, e.g., matching rules in the TCAM of the switch.

The route trace module 560, in response to a determination that a route trace should be performed, either through manual input instigating the route trace, an automated process instigating the route trace in response to detected triggering conditions, or the like, the route trace module 560 generates a trace data packet, wraps trace data packet into a packet_out data structure, and transmits the packet_out to the ingress device of the SDN for initiating the trace operation. In generating the trace data packet, the route trace module 560 determines the color value or label associated with the ingress device connected to the source host system and populates a corresponding color field in the header of the trace data packet. The route trace module 560 further receives packet_in messages forwarded by the devices of the SDN based on the application of their deployed route tracing matching rules, and generates/updates a route trace entry in a trace data structure accessible via the route trace data structure interface 570. The route trace entry specifies at least an identifier of the device in the SDN that received the trace data packet. Other information that may be included in the route trace entry may include port identifiers, timestamps, and other information that may be pertinent regarding the routing of the trace data packet for purposes of debugging, troubleshooting, or management of the operation of the devices of the SDN.

Figure 6:
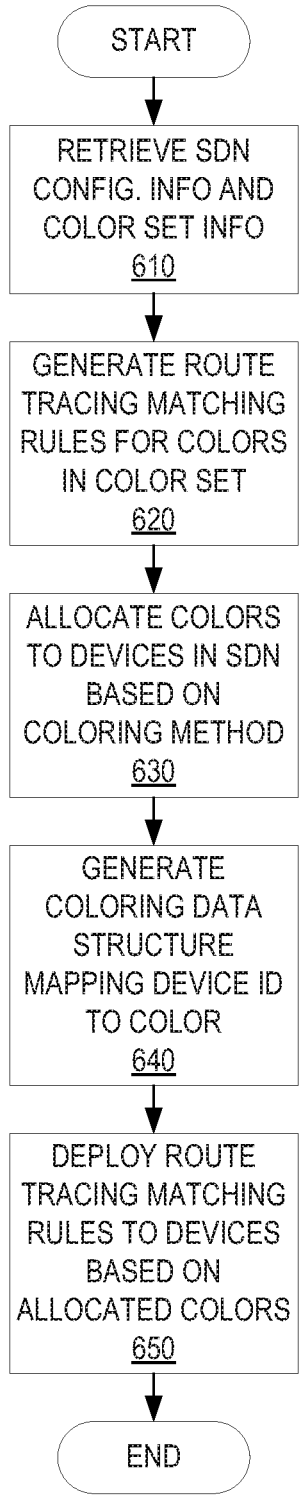
FIG. 6 is a flowchart outlining an example operation of a network controller when configuring devices of a SDN for route tracing based on a coloring methodology in accordance with one illustrative embodiment.

FIG. 6 is a flowchart outlining an example operation of a network controller when configuring devices of a SDN for route tracing based on a coloring methodology in accordance with one illustrative embodiment. As shown in FIG. 6, the operation starts with retrieving SDN topology configuration information identifying the switch devices within the SDN and a color set configuration for use in coloring the devices of the SDN (step 610). A set of route tracing matching rules is generated for each of the colors in the color set such that there is at least one route tracing matching rule keyed to each of the colors in the color set (step 620). Based on the color set configuration and the SDN configuration information, colors are allocated to the various devices of the SDN in accordance with a coloring methodology implemented by the network controller (step 630). As discussed above, in some illustrative embodiments, this coloring methodology includes ensuring that colors are assigned to the devices such that no two adjacent devices have a same color assigned to them.

Based on the assignment of colors to the various devices of the SDN as identified in the SDN configuration information, a coloring data structure is generated that maps device identifiers to particular color values or labels (step 640). Based on the mapping of color values or labels to device identifiers, subsets of the route tracing matching rules are deployed to each of the devices in the SDN (step 650). As discussed above, this involves sending separate sets of route tracing matching rules to the different devices based on the particular color value/label assigned to that device. In some illustrative embodiments, this involves deploying route tracing matching rules to the device that are keyed to color values/labels other than the color value/label assigned to that device, e.g., if the device is assigned the color value "red", then the route tracing matching rules deployed to that device are keyed to the color values "blue" and "green." The device integrates the route tracing matching rules into their forwarding rule set, such as may be maintained in a TCAM or other storage mechanism of the device. The operation then terminates.

Figure 7:
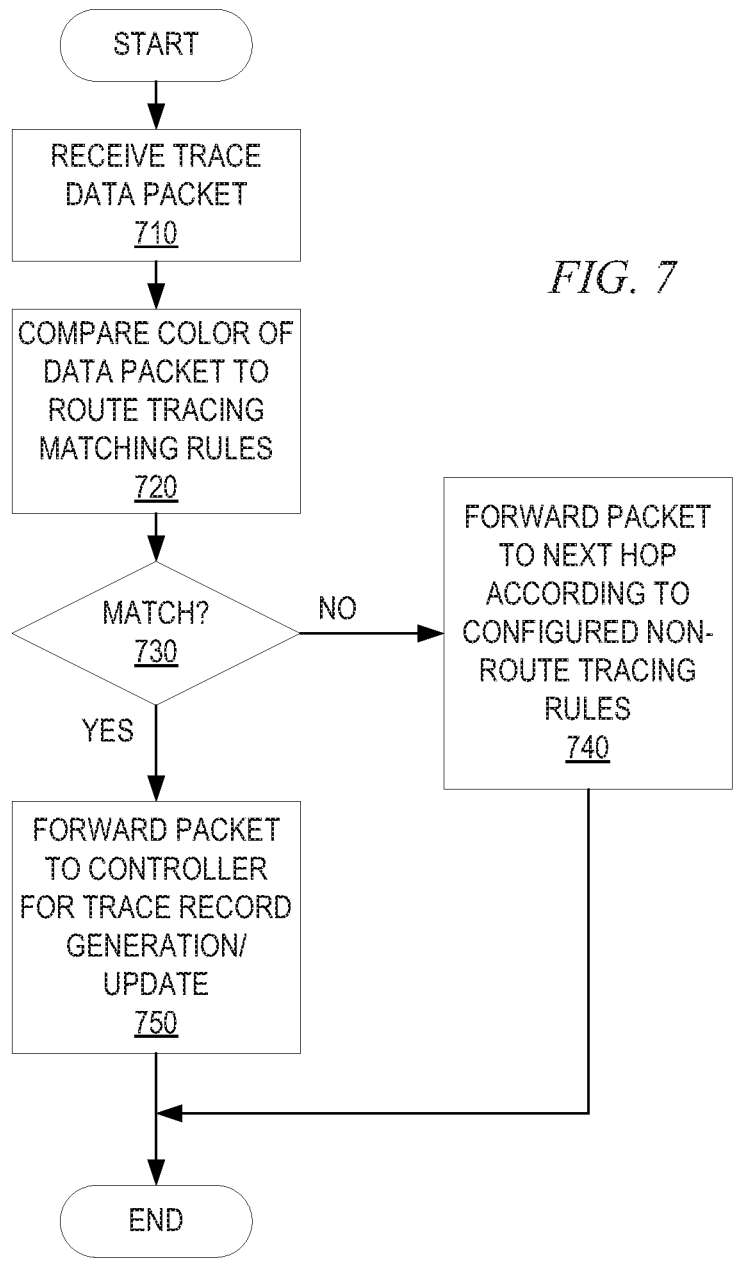
FIG. 7 is a flowchart outlining an example operation of a data packet forwarding device of a network in accordance with one illustrative embodiment.

FIG. 7 is a flowchart outlining an example operation of a data packet forwarding device of a network in accordance with one illustrative embodiment. It is assumed for purposes of the operation outlined in FIG. 7 that the forwarding device of the SDN has been configured with route tracing matching rules keyed to one or more color values/labels in accordance with one or more of the embodiments of the present invention, e.g., in the manner set forth in FIG. 6. As shown in FIG. 7, the operation starts with the receipt of a trace data packet that has been configured with a color value/label in a color field of the trace data packet header (step 710). The color value/label is compared to color value/labels in color fields of route tracing matching rules to determine if there is a match between the two color values/labels (step 720). It should be appreciated that finer grain control over such tracing can be achieved by requiring matching of additional header fields as well, e.g., source id, source port, destination id, destination port, etc. if desired but for purposes of this discussion it is assumed that the matching is done only with regard to the color field for simplicity.

A determination is made as to whether a route tracing matching rule is matched by the color value/label in the color field of the header of the received trace data packet (step 730). If not, then the trace data packet is forwarded along to a next device in the SDN using the other matching rules implemented by the device (step 740) and the operation then terminates. If there is a match, then the trace data packet is forwarded to the network controller for trace record generation/update (step 750) and the operation then terminates.

It should be appreciated that this operation of the data packet forwarding device does not require any change in the logic of the data packet forwarding device. From the perspective of the data packet forwarding device, it is just applying matching rules to the received data packet. The change in functionality comes from the type of matching rules deployed into the data packet forwarding device and the change in the header information of the data packet that is received, i.e. setting a color value/label in the color field of the header of the data packet. The fact that the data packet is a trace data packet is only known to the network controller which generates the trace data packet and sets the values in the header fields to facilitate the tracing of the route taken by the data packet through the SDN.

Figure 8:
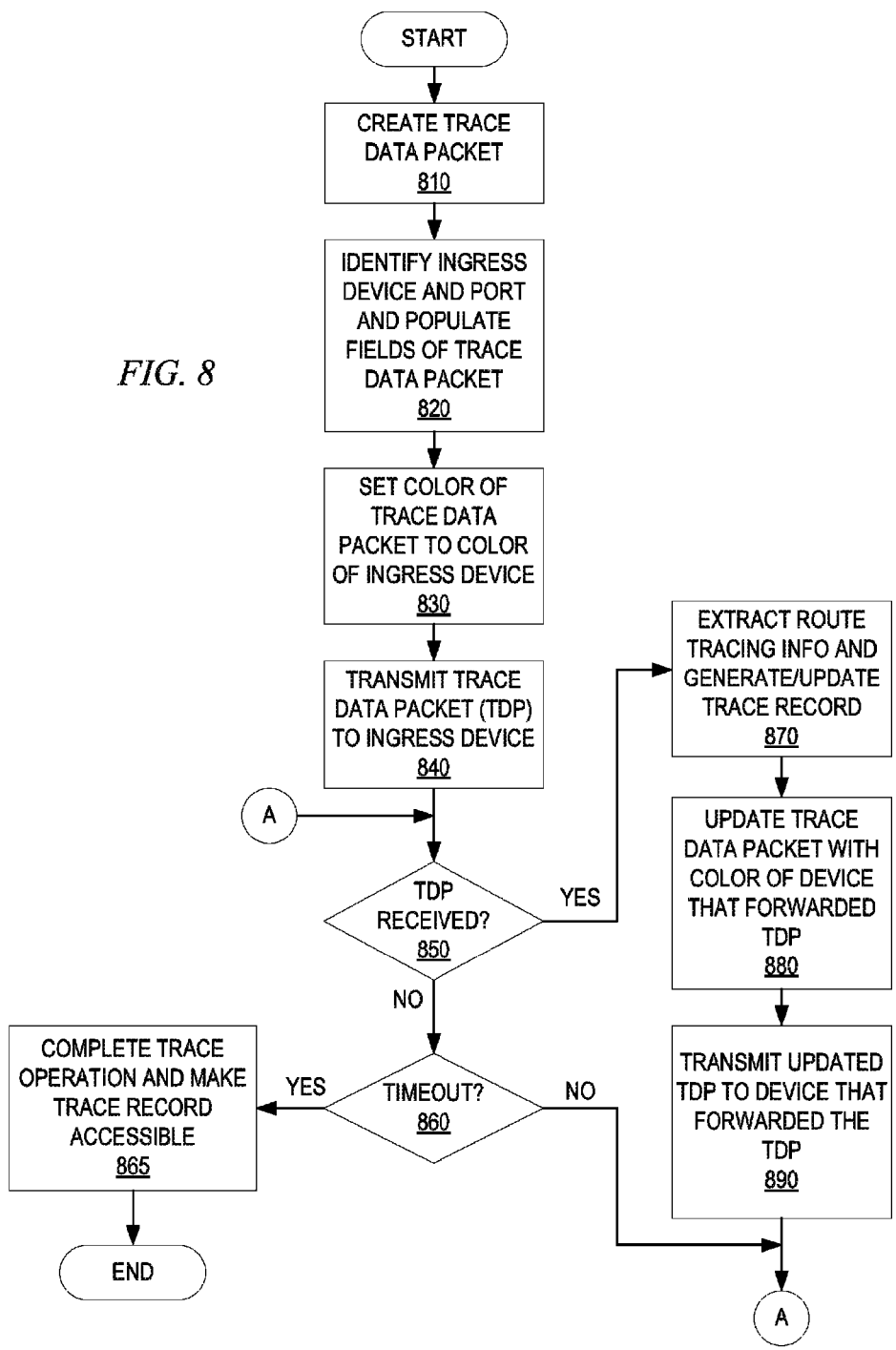
FIG. 8 is a flowchart outlining an example operation of a network controller when performing a route tracing operation in accordance with one illustrative embodiment.

FIG. 8 is a flowchart outlining an example operation of a network controller when performing a route tracing operation in accordance with one illustrative embodiment. The operation outlined in FIG. 8 may be triggered in response to a manual or automatic mechanism initiating the operation in response to a determination that a trace of a data packet through the SDN is desired. Thus, for example, a system administrator may determine that a condition has arisen in the SDN requiring information at the SDN level regarding the way in which data packets are being routed through the SDN and thus, a trace of a data packet is needed to investigate, debug, troubleshoot, or otherwise manage the operation of the SDN. Similarly, an automated tool may determine that such a condition has arisen through monitoring of performance characteristics of the SDN, may have a scheduled or periodic trace operation configured into its operation, or otherwise trigger such a trace in response to detected conditions of the SDN. Regardless of the way in which the trace is triggered, the operation outlined in FIG. 8 may be implemented in response to such a trigger.

As shown in FIG. 8, the operation starts with creation of a trace data packet by replicating a data packet for which a trace is desired and populating header fields with corresponding information for the replicated data packet (step 810). An ingress data packet forwarding device and port are identified based on SDN configuration information and the identification of a host system from which the trace data packet is to emulate as a source (step 820). A color value/label corresponding to the identified ingress data packet is set in the color field of the trace data packet (step 830) and the trace data packet is transmitted to the identified port of the ingress data packet forwarding device (step 840).

The transmission of the trace data packet may comprise utilizing the packet_in or packet_out messaging mechanisms to provide routing information for the trace data packet. That is, it should be appreciated that while the description of the illustrative embodiments refers to the trace data packet itself being modified to include, in the header information, the switch, port, and other routing information upon which the illustrative embodiments operate, the illustrative embodiments are not limited to such mechanisms. To the contrary, with the illustrative embodiments, or in other illustrative embodiments, a wrapper may be applied to the trace data packet with the wrapper comprising the routing information used by the mechanisms of the illustrative embodiments to trigger rules in the switches. For example, the trace data packet may be wrapped into a packet_in or packet_out message with these messages being exchanged between switches and the SDN controller. In such a case, the trace data packet itself may still carry the color information for the trace data packet in a color field of the header information for the trace data packet, but the routing information may be maintained in a wrapper of the trace data packet, such as the packet_in or packet_out message. For purposes of this description, it should be assumed that wherever the description refers to the trace data packet itself comprising source, port, or other routing information, that this information may instead be provided in a wrapper of the trace data packet, depending upon the desired implementation.

With reference again to FIG. 8, a determination is made as to whether a trace data packet is received from the SDN (step 850). If not, the operation determines if a timeout condition has occurred which is indicative of an end of trace (step 860). A predetermined timeout interval may be set as a configuration parameter that identifies an expected time interval beyond which the trace data packet is likely to have reached the destination host system. A timeout can also be set based on the expected time during which at least one new packet_in event must be detected by the trace route at the SDN controller. Alternatively monitoring for the transmission of an acknowledge data packet back from the destination host system may also be utilized in some embodiments. If a timeout condition, acknowledgement packet, or other indicator of the trace data packet having reached the destination, is not detected, the operation returns to step 850 and continues to monitor for receipt of a trace data packet. If a timeout condition, acknowledgement packet, or other indicator is detected, then the trace operation is complete, the trace data record may be output or otherwise utilized to identify the route traversed by the trace data packet for debugging, troubleshooting or management of the SDN operation (step 865), and the trace operation is terminated.

If a trace data packet is received (step 850), then the route tracing information is extracted from the trace data packet or otherwise gathered and stored in a newly generated or updated route trace record corresponding to the trace data packet, e.g., corresponding to the particular source/destination host system pair (step 870). The trace data packet is then updated to reset the color value/label in the header of the trace data packet to the color value/label corresponding to the data packet forwarding device that forwarded the trace data packet to the controller (step 880) and the updated trace data packet is transmitted back to that data packet forwarding device (step 890). The operation then returns to step 850 where continued monitoring for the return of the trace data packet is performed.

Thus, the illustrative embodiments provide mechanisms for performing route tracing of a data packet through a software defined network utilizing a coloring methodology for coloring the devices of the software defined network. The mechanisms of the illustrative embodiments provide such route tracing capability in a non-invasive manner since the logic and functionality of the data packet forwarding devices, e.g., switches, of the software defined network themselves are not modified. These devices merely implement additional matching rules that are configured to perform route tracing by forwarding the matching data packet to a software defined network controller. As such, the mechanisms of the illustrative embodiments introduce very low table resource overhead and cause no performance overhead with regard to the forwarding behavior of the data packet forwarding device. Moreover, the mechanisms of the illustrative embodiments are compatible with existing SDN hardware and protocols since no change in the functionality of the data packet forwarding devices is necessary. Furthermore, the mechanisms of the illustrative embodiments may be easily deployed in a production network along-side other SDN applications for debugging, troubleshooting, or management of the SDN.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory and implementing a software defined network (SDN) controller, for tracing a route taken by a packet in a SDN, the method comprising:
    assigning, by the SDN controller, each switch in the SDN a first color label, from a set of color labels, such that adjacent switches have different color labels;
    installing, by the SDN controller, one or more rules in each switch to forward a received data packet to the SDN controller in response to a second color label of the received data packet not matching the first color label assigned to the switch;
    assigning, by the SDN controller, a second color label, from the set of color labels, to a trace data packet; and
    tracing, by the SDN controller, a route of the trace data packet through the SDN based on the second color label and application of the one or more rules to the trace data packet at each of the switches in the SDN as the trace data packet is received by each of the switches in the SDN.

2. The method of claim 1, wherein the color labels in the set of color labels are non-unique color labels, and wherein at least two non-adjacent switches in the SDN have a same assigned color label.

3. The method of claim 1, wherein assigning the second color label to the trace data packet comprises selecting the second color label to be a same color label as the first color label of a first switch in the SDN to which the trace data packet is to be transmitted.

4. The method of claim 1, wherein tracing the route of the trace data packet comprises:
    receiving, by the SDN controller, the trace data packet from a second switch in the SDN, to which the trace data packet was forwarded by a first switch in the SDN, in response to the one or more rules installed in the second switch indicating that the second color label of the trace data packet does not match a first color label assigned to the second switch; and recording, by the SDN controller, in a trace data structure, trace information extracted from the received trace data packet.

5. The method of claim 1, wherein tracing the route of the trace data packet further comprises, repeatedly performing the following operations until the trace data packet arrives at a destination:

at a next switch along the route, determining if the second color label of the trace data packet matches a first color label associated with that switch; and in response to the second color label of the trace data packet not matching the first color label associated with that switch:

transmitting, by that switch, the trace data packet to the SDN controller;

updating, by the SDN controller, the second color label of the trace data packet to be a color label matching the first color label assigned to that switch to generate an updated trace data packet with an updated first color label; and transmitting, by the SDN controller, the updated trace data packet back to that switch.

6. The method of claim 5, wherein that switch applies the one or more rules to the updated trace data packet and, in response to there not being a match of the updated first color label with the one or more rules, forwards the updated trace data packet to a next switch in the SDN, and wherein the next switch in the SDN applies rules installed in the next switch to either forward the updated data packet to the SDN controller or forward the updated data packet to another next switch in the SDN along the route to the destination of the trace data packet.

7. The method of claim 4, wherein the trace information extracted from the received trace data packet comprises identification information for the second switch and an ingress port through which the second switch received the trace data packet from the first switch.

8. The method of claim 1, wherein installing one or more rules in each switch to forward a received data packet to the SDN controller in response to a second color label of the received data packet not matching the first color label assigned to the switch comprises, for each switch in the SDN, installing a rule for each color label in the set of color labels that does not match the first color label assigned to the switch, to forward a received data packet to the SDN controller, and wherein each of the one or more rules is assigned a highest priority value within a set of routing rules installed in the switch.

9. The method of claim 1, wherein the second color label is stored in an unused header field of the trace data packet.

10. The method of claim 9, wherein the unused header field is one of a VLAN Priority Code Point (PCP) header field or a IP ToS header field.

11. A computer program product comprising a computer readable storage medium having a computer readable program stored therein, wherein the computer readable program, when executed on a computing device implementing a software defined network (SDN) controller, causes the computing device to:

assign, by the SDN controller, each switch in the SDN a first color label, from a set of color labels, such that adjacent switches have different color labels;

install, by the SDN controller, one or more rules in each switch to forward a received data packet to the SDN controller in response to a second color label of the received data packet not matching the first color label assigned to the switch;

assign, by the SDN controller, a second color label, from the set of color labels, to a trace data packet; and trace, by the SDN controller, a route of the trace data packet through the SDN based on the second color label and application of the one or more rules to the trace data packet at each of the switches in the SDN as the trace data packet is received by each of the switches in the SDN.

12. The computer program product of claim 11, wherein the color labels in the set of color labels are non-unique color labels, and wherein at least two non-adjacent switches in the SDN have a same assigned color label.

13. The computer program product of claim 11, wherein the computer readable program causes the computing device to assign the second color label to the trace data packet comprises selecting the second color label to be a same color label as the first color label of a first switch in the SDN to which the trace data packet is to be transmitted.

14. The computer program product of claim 11, wherein the computer readable program causes the computing device to trace the route of the trace data packet at least by:

receiving, by the SDN controller, the trace data packet from a second switch in the SDN, to which the trace data packet was forwarded by a first switch in the SDN, in response to the one or more rules installed in the second switch indicating that the second color label of the trace data packet does not match a first color label assigned to the second switch; and recording, by the SDN controller, in a trace data structure, trace information extracted from the received trace data packet.

15. The computer program product of claim 11, wherein the computer readable program causes the computing device to trace the route of the trace data packet at least by repeatedly performing the following operations until the trace data packet arrives at a destination:

at a next switch along the route, determining if the second color label of the trace data packet matches a first color label associated with that switch; and in response to the second color label of the trace data packet not matching the first color label associated with that switch:

transmitting, by that switch, the trace data packet to the SDN controller;

updating, by the SDN controller, the second color label of the trace data packet to be a color label matching the first color label assigned to that switch to generate an updated trace data packet with an updated first color label; and transmitting, by the SDN controller, the updated trace data packet back to that switch.

16. The computer program product of claim 15, wherein that switch applies the one or more rules to the updated trace data packet and, in response to there not being a match of the updated first color label with the one or more rules, forwards the updated trace data packet to a next switch in the SDN, and wherein the next switch in the SDN applies rules installed in the next switch to either forward the updated data packet to the SDN controller or forward the updated data packet to another next switch in the SDN along the route to the destination of the trace data packet.

17. The computer program product of claim 14, wherein the trace information extracted from the received trace data packet comprises identification information for the second switch and an ingress port through which the second switch received the trace data packet from the first switch.

18. The computer program product of claim 11, wherein the computer readable program causes the computing device to install one or more rules in each switch to forward a received data packet to the SDN controller in response to a second color label of the received data packet not matching the first color label assigned to the switch at least by, for each switch in the SDN, installing a rule for each color label in the set of color labels that does not match the first color label assigned to the switch, to forward a received data packet to the SDN controller, and wherein each of the one or more rules is assigned a highest priority value within a set of routing rules installed in the switch.

19. The computer program product of claim 11, wherein the second color label is stored in an unused header field of the trace data packet.

20. An apparatus comprising:
a processor; and
a memory coupled to the processor, wherein the memory comprises instructions which, when executed by the processor, cause the processor to implement a software defined network (SDN) controller, and wherein the SDN controller implemented by the processor is configured to:

assign each switch in the SDN a first color label, from a set of color labels, such that adjacent switches have different color labels;

install one or more rules in each switch to forward a received data packet to the SDN controller in response to a second color label of the received data packet not matching the first color label assigned to the switch;

assign a second color label, from the set of color labels, to a trace data packet; and trace a route of the trace data packet through the SDN based on the second color label and application of the one or more rules to the trace data packet at each of the switches in the SDN as the trace data packet is received by each of the switches in the SDN.

\* \* \* \* \*